US011168645B2

(12) United States Patent
Maalioune et al.

(10) Patent No.: US 11,168,645 B2
(45) Date of Patent: Nov. 9, 2021

(54) DEVICE FOR ACTUATING A THRUST REVERSER WITH AN ANTI-DEPLOYMENT MEMBER

(71) Applicants: Safran Nacelles, Gonfreville l'Orcher (FR); Safran Electronics & Defense, Boulogne-Billancourt (FR)

(72) Inventors: Hakim Maalioune, Gonfreville l'Orcher (FR); Julien Corbin, Gonfreville l'Orcher (FR); Jean-Philippe Joignet, Boulogne Billancourt (FR); Julien Hautecoeur, Boulogne Billancourt (FR); Yvon Joncour, Boulogne Billancourt (FR); Jean-Michel Figuet, Gonfreville l'Orcher (FR)

(73) Assignees: Safran Nacelles, Gonfreville l'Orcher (FR); Safran Electronics & Defense, Boulogne Billancourt (FR)

( * ) Notice: Subject to any disclaimer, the term of this patent is extended or adjusted under 35 U.S.C. 154(b) by 199 days.

(21) Appl. No.: 16/562,814

(22) Filed: Sep. 6, 2019

(65) Prior Publication Data

US 2019/0390633 A1 Dec. 26, 2019

Related U.S. Application Data

(63) Continuation of application No. PCT/FR2018/050513, filed on Mar. 6, 2018.

(30) Foreign Application Priority Data

Mar. 6, 2017 (FR) .................................... 17/51794

(51) Int. Cl.
*F02K 1/76* (2006.01)
*B64C 13/30* (2006.01)

(52) U.S. Cl.
CPC .............. *F02K 1/763* (2013.01); *B64C 13/30* (2013.01); *F02K 1/766* (2013.01)

(58) Field of Classification Search
CPC .......... F02K 1/763; F02K 1/766; B64C 13/30
See application file for complete search history.

(56) References Cited

U.S. PATENT DOCUMENTS 4,442,928 A 4/1984 Eastman
5,826,823 A * 10/1998 Lymons ................ B64D 33/04
244/110 B (Continued)

FOREIGN PATENT DOCUMENTS

EP 1052427 11/2000

OTHER PUBLICATIONS

International Search Report for International Application PCT/FR2018/050513, dated Jun. 20, 2018.

*Primary Examiner* — Lorne E Meade
(74) *Attorney, Agent, or Firm* — Burris Law, PLLC

(57) ABSTRACT

An actuation device for a thrust reverser includes thrust-reversal movable elements carried by a nacelle and displaceable between a retracted and deployed position. The actuating device includes two actuators mounted on the nacelle and connected to a motor and to the movable elements. The actuation device drives the movable elements in a retraction or deployment direction over a course of the actuators between the retracted and deployed position. The actuation device further includes locks for locking the movable elements in the retracted position and antideployment members associated with the actuators which allow free operation of the actuators in the direction of retraction and retain the actuators in the direction of deployment. The antideployment bodies further provide free operation of the actuators in the direction of deployment over part of the actuators (Continued)

stroke that corresponds to a shift from an over-retraction position to the retraction position of the movable elements.

9 Claims, 2 Drawing Sheets

(56) References Cited

U.S. PATENT DOCUMENTS

| | | | | |
|---|---|---|---|---|
| 6,487,845 | B1 * | 12/2002 | Modglin | F02K 1/60<br>60/226.2 |
| 6,494,033 | B1 * | 12/2002 | Davies | F02K 1/76<br>188/162 |
| 6,684,623 | B2 * | 2/2004 | Langston | F02K 1/763<br>60/226.2 |
| 8,038,184 | B2 | 10/2011 | Grigis | |
| 8,417,369 | B2 | 4/2013 | Honegger et al. | |
| 8,590,287 | B2 * | 11/2013 | Lenk | F02K 1/766<br>60/230 |
| 8,793,973 | B2 | 8/2014 | Vauchel | |
| 9,188,081 | B2 * | 11/2015 | Wingett | F02K 1/763 |
| 9,394,980 | B2 * | 7/2016 | Jones | F16D 67/02 |
| 9,476,383 | B2 | 10/2016 | Caruel | |
| 10,054,079 | B2 * | 8/2018 | Kopecek | F02K 1/766 |
| 10,605,196 | B2 * | 3/2020 | Caruel | F02K 1/70 |
| 2003/0159429 | A1 | 8/2003 | Langston et al. | |
| 2009/0090203 | A1 | 4/2009 | Jones et al. | |
| 2013/0264399 | A1 | 10/2013 | Wingett et al. | |
| 2017/0022934 | A1 * | 1/2017 | Caruel | F02K 1/70 |

* cited by examiner

DEVICE FOR ACTUATING A THRUST REVERSER WITH AN ANTI-DEPLOYMENT MEMBER

CROSS-REFERENCE TO RELATED APPLICATIONS

This application is a continuation of International Application No. PCT/FR2018/050513, filed on Mar. 6, 2018, which claims priority to and the benefit of FR 17/51794 filed on Mar. 6, 2017. The disclosures of the above applications are incorporated herein by reference.

FIELD

The present disclosure relates to a device for actuating a thrust reverser, and a method for using such a device.

BACKGROUND

The statements in this section merely provide background information related to the present disclosure and may not constitute prior art.

There are known devices for actuating a thrust reverser comprising thrust reversal movable elements, generally two thrust reversal movable elements, carried by a nacelle to be displaced between a retracted position and a deployed position, the actuation device including actuators mounted on the nacelle and connected on the one hand to an motor, and on the other hand to the thrust reversal movable elements to maneuver them in a direction of retraction or deployment over a stroke of the actuators comprised between a retracted position and a deployed position of the thrust reverser members, and locks ensuring holding of the thrust reversal movable elements in the retracted position, and constituting means for retaining the thrust reverser against inadvertent deployment in flight. The thrust reversal movable elements tend to be deployed naturally under the effect of the aerodynamic forces to which they are subjected until they reach their full opening stop. Due to the inertial effect of the movable parts constituting the actuation device, the arrival of the thrust reversal movable elements on the deployment stops generates a dynamic shock harmful for the structure of the nacelle. To control the deployment time and avoid this impact shock on the deployment stops, it is necessary to monitor the deployment speed of the actuators. However, in the case of failure of the control of the actuators or in the case of mechanical breakage in the mechanical transmission chain of the actuation device, the thrust reversal movable elements may be deployed at an excessive speed and generate an impact upon their arrival in stop. To guard against these degraded cases, it is known to equip the actuation devices with anti-deployment members configured to ensure a free operation of the actuators in the direction of retraction and ensure retention of the actuators in the direction of deployment. The anti-deployment member serves to generate a higher friction as the tensile force exerted on the actuator is considerable.

The introduction of this anti-deployment member, however, generates another issue that must be overcome: when the thrust reverser is in the closed position, the anti-deployment member blocks the movement of the actuator in an undesired position. This is incompatible with the structural dimensioning of the thrust reverser since the force path ensuring the blocking of the thrust reversal movable element passes through the actuator while the desired position is a retraction position of the thrust reversal movable elements for which these are in contact with at least one primary lock. A primary lock is by definition a lock through which passes the force path ensuring the blocking of the thrust reversal movable element.

SUMMARY

The present disclosure provides a device for actuating a thrust reverser adapted to avoid the risks of impact at high speed on the deployment stops while, in the closed position, the force path of the doors blocking pass through the primary locks and not the actuator A device for actuating a thrust reverser comprising at least one thrust reversal movable element carried by a nacelle to be displaced between a retracted position and a deployed position is proposed, the actuation device including: at least one actuator mounted on the nacelle and connected on the one hand to a motor, and on the other hand to said at least one thrust reversal movable element to maneuver the latter in a direction of retraction or deployment over a stroke of said at least one actuator comprised between a retracted position and a deployed position of said at least one thrust reversal retracted and movable element; at least one lock for blocking said at least one thrust reversal movable element in the position; and at least one anti-deployment member associated with said at least one actuator for providing free operation of said at least one actuator in the direction of retraction and providing retention of said at least one actuator in the direction of deployment, in which said at least one anti-deployment member is configured to provide a free operation of said at least one actuator in the direction of deployment over a portion of the stroke of said at least one actuator corresponding to a passage from an over-retraction position of said at least one thrust reversal movable element to a retraction position of said at least one thrust reversal movable element. The term retraction position in the sense of the present disclosure means a position of the thrust reversal movable elements for which they are in contact with a so-called primary lock, that is to say a lock through which the force path passes, providing the blocking of the door, and the term over-retraction position means a position for which the thrust reversal movable elements abut on the nacelle beyond the retraction position.

The anti-deployment member is characterized by the fact that it is passive over a stroke between the over-retraction position and the retraction position, that is to say that it does not bring in friction over this part of the stroke. Thanks to this feature of the anti-deployment member, it is thus provided that, when the thrust reverser is in the closed position, the force path of the doors blocking passes through the primary locks provided for this purpose and not through the actuator of the actuation device.

According to other features of the present disclosure considered separately or in combination: the device includes a motor directly associated with each actuator; the device includes a motor associated with several actuators by means of mechanical transmission members; the device includes at least one first actuator driven by a motor, and at least one second actuator driven by the first actuator; the device includes at least two actuators having different actuation strokes or speeds; said at least one lock is electrically controlled; said at least one lock is hydraulically controlled; the motor is an electric motor; the motor is a hydraulic motor.

According to another aspect of the present disclosure, a method for using the device defined hereinabove is provided, in which, starting from a deployed position of said at least one thrust reverser member, the method includes the steps of: controlling said at least one actuator in a direction of retraction of said at least one thrust reverser member to maneuver it in a direction of retraction, until said at least one thrust reverser member has reached an over-retraction position, providing a closure of said at least one lock, and controlling said at least one actuator in a direction of deployment until a portion of said at least one lock carried by said at least one thrust reverser member is in contact with a portion of said at least one lock carried by the nacelle.

Thus, on the one hand the lock is maneuvered under conditions facilitating this maneuver, and on the other hand the actuator is finally free from any constraint when the thrust reversal movable elements are in a closed and locked position.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
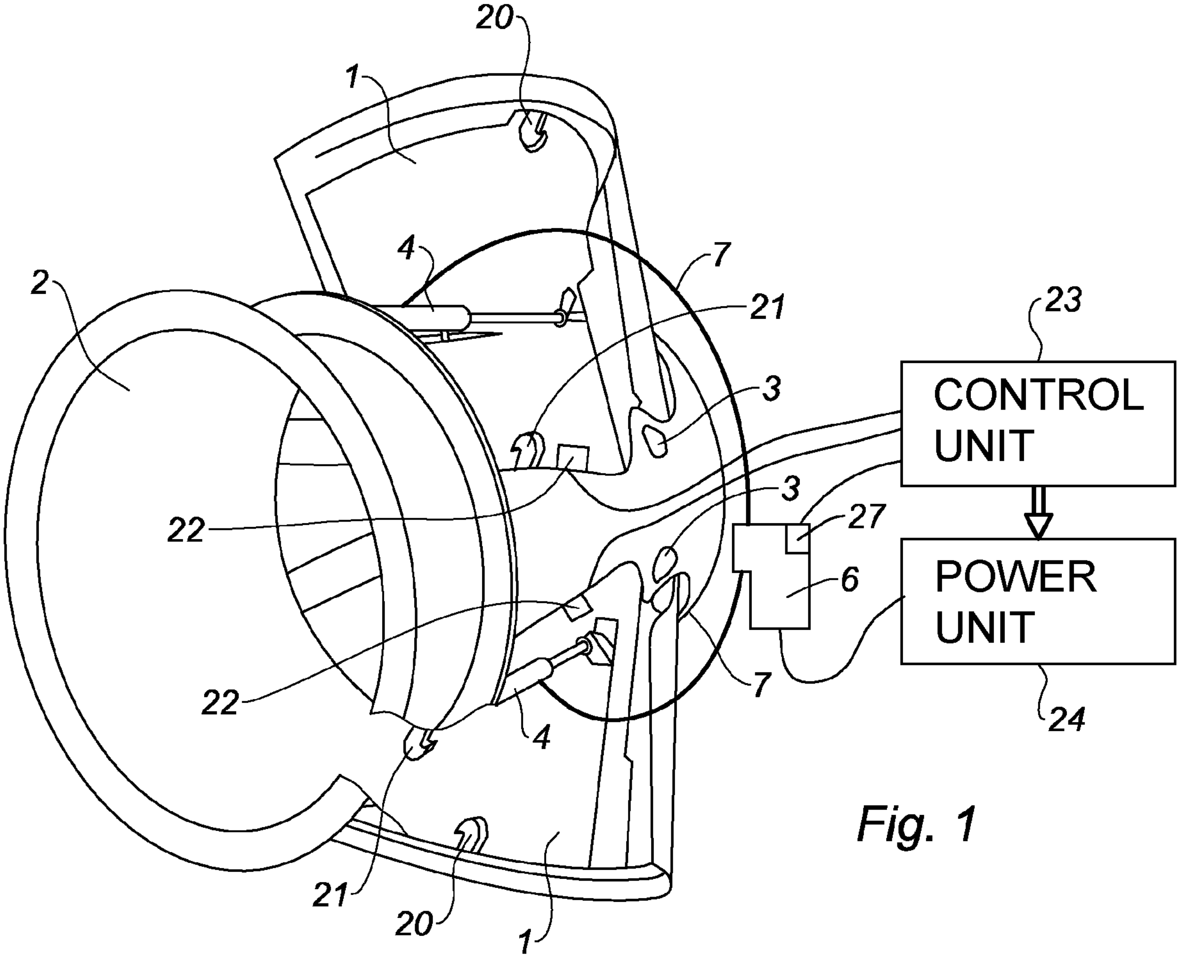
FIG. 1 is a schematic perspective view partially broken away of a nacelle equipped with the actuation device according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
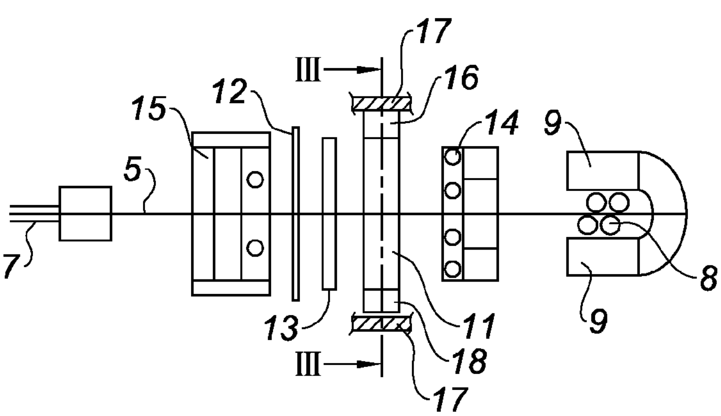
FIG. 2 is an exploded schematic representation of a portion of an actuator according to the present disclosure.

Referring to FIGS. 1 and 2, the actuation device according to the present disclosure is intended for the maneuver of thrust reversal movable elements, herein two doors 1, carried by a nacelle 2 to pivot about axes 3, between a retracted position and a deployed position. The actuation device includes two actuators 4 mounted on the nacelle and each having an axial member 5 (FIG. 2) connected to a motor, herein an electric motor 6 connected to a power unit 24 itself connected to a controller 23 also connected to sensors, in particular a door position sensor 22, and a motor sensor 27, intended to supply the control unit 23 with the information necessary for the proper operation of the actuation device, in particular with regards to the position of the doors 1. Each actuator 4 has an end hingedly fastened to the body of the nacelle 2 and an opposite end hingedly fastened to a door 1, either directly or by a connecting rod linkage also hingedly fastened to a nut 9 mounted on a ball screw 8 of the axial member 5. The position of the output nut 9 of the actuator 4 is determined by the rotation of the axial member 5 connected to the electric motor 6 by a flexible mechanical transmission cable 7.

Each actuator 4 further includes an anti-deployment member including: a toothed wheel 11 mounted idle on the axial member 5 and associated with a pawl 16 hingedly fastened to the case 17 of the actuator; a friction plate 13 disposed between the toothed wheel 11 and a support plate 12 fixed on the axial member 5. The toothed wheel 11, the friction plate 13 and the support plate 12 are held tight against each other between a front bearing 14 and a rear bearing 15.

Figure 3:
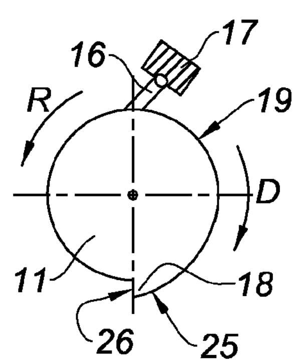
FIG. 3 is a schematic sectional view according to the line III-III of FIG. 2.

The toothed wheel 11 includes one single tooth 18 projecting from a smooth side surface 19. The tooth 18 has a ramp-shaped side 25 and an opposite side having a steep edge 26. The operation of the anti-deployment device is as follows:

When the axial member 5 is rotatably driven in the direction of a retraction, shown in FIG. 3 by an arrow R, in each turn the pawl 16 gets on the ramp 25 and falls on the side of the edge 26. The toothed wheel 11 turns with the support plate 12 without slipping. The axial member 5 rotates freely.

When the axial member 5 is rotatably driven in the direction of a deployment, shown in FIG. 3 by an arrow D, as long as the pawl 16 slips on the smooth side wall 19, the toothed wheel 11 rotates with the support plate 12 without slipping. The axial member 5 rotates freely. But when the pawl 16 abuts on the front 26, the toothed wheel is blocked in rotation and the support plate slips relative to the toothed wheel 11 with a rubbing against the friction plate 13. The rotation of the axial member 5 is braked. According to the present disclosure, the actuator is configured so that the unbraked rotation corresponds to the stroke portion between the over-retraction position and the retraction position. To this end, the angular position of the tooth 18 is calculated as a function of the pitch of the ball screw 8 and the diameter of the toothed wheel 11 so that the steep edge 26 of the tooth 18 bears against the pawl 16 when the nut 9 is in the retraction position (position A in FIG. 4).

Furthermore, the actuation device includes, in a manner known per se, primary locks comprising hooks 20 fastened to each of the doors 1 and disposed to be coupled, during the retraction of the thrust reversal movable elements, with hooks 21 carried by a pivoting arm resiliently brought back towards a closed position of the lock and associated for opening with an actuator.

Figure 4:
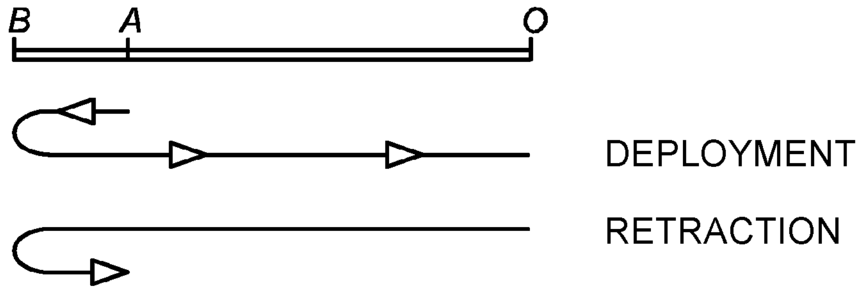
FIG. 4 is a schematic diagram illustrating the movements of a thrust reversal movable element resulting from the use of the actuation device according to the present disclosure.

FIG. 4 is a diagram which illustrates the displacements of the nut 9 during the rotation of the axial member 5. The letter A illustrates the retraction position of the doors and the letter B illustrates the over-retraction position, whereas the letter 0 illustrates the end-of-stroke position of the doors during deployment.

During deployment, starting from the point A, the nut 9 is first displaced towards the over-retraction position B (spaced from the retraction position A by a few millimeters only), which makes a spacing of the hooks 20 and 21 just enough to enable disengagement of the hooks 21 in the direction of opening the locks. Afterwards, the axial member 5 is driven in the direction of deployment until the thrust reversal movable elements 1 come to an end-of-stroke stop designated by the letter 0.

Figure 5:
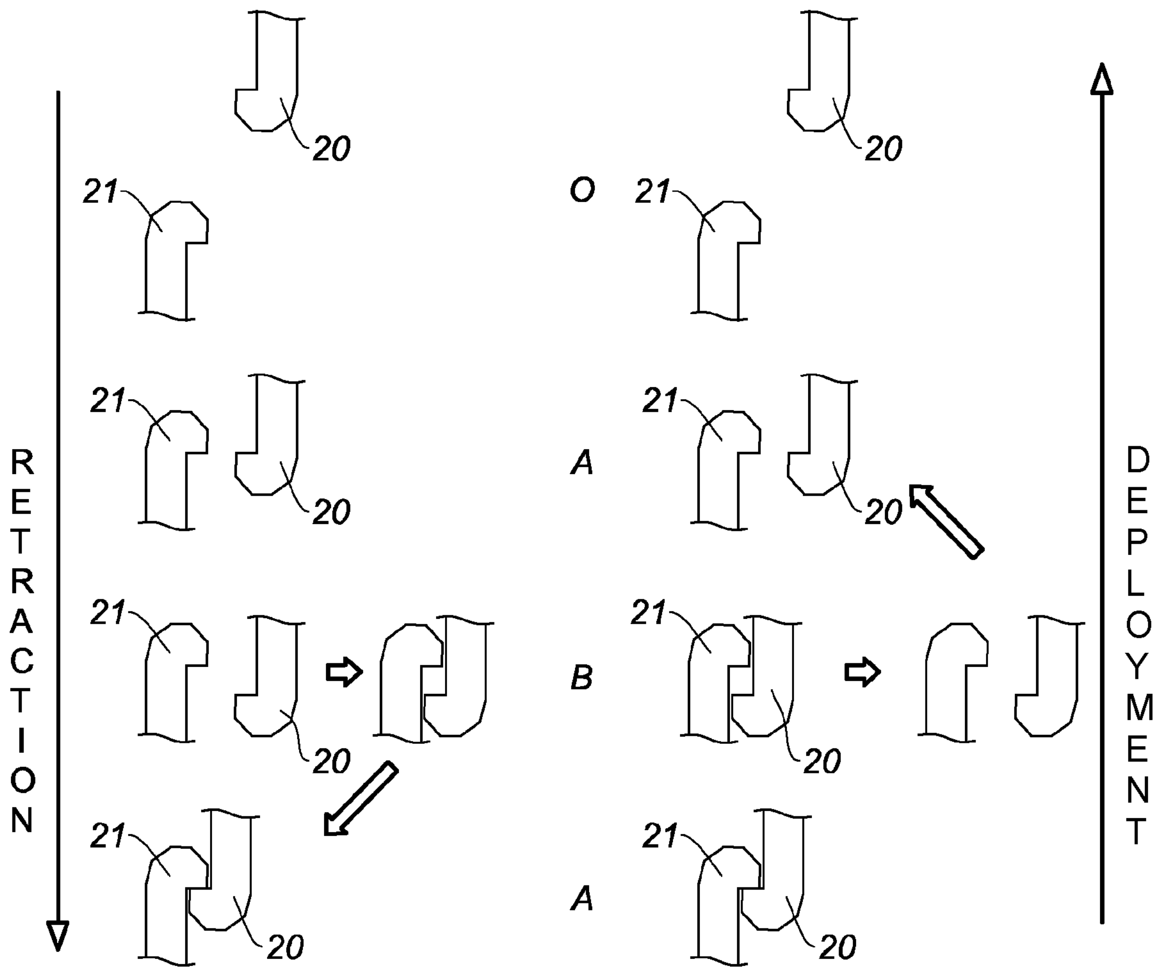
FIG. 5 is a diagram illustrating the relative position of the portions of a primary lock as a function of the position of the thrust reversal movable element according to the present disclosure.

During retraction, starting from the point O, the nut 9 is first displaced in a direction of retraction until the nut 9 reaches the over-retraction position B. The primary locks are then closed and the nut 9 is displaced in the direction of deployment up to the retraction position A. As illustrated in FIG. 5, in this position the hooks 20 and 21 bear against each other and are therefore loaded whereas the actuators are released from any load.

Of course, the present disclosure is not limited to the described form and is likely to give rise to alternative forms without departing from the scope of the present disclosure as defined by the claims.

In particular, although the device according to the present disclosure has been illustrated with one single electric motor for the two door actuators, the present disclosure may be made with a hydraulic motor and/or by providing an electric motor associated with each actuator, the motor 6 being in direct mechanical transmission, or by means of a reducer with the main shaft 5 of the actuator 4.

Although the present disclosure has been described in connection with an actuation device including one single lock per door, it is possible to carry out the present disclosure with several associated locks according to combinations in compliance with the specifications concerning the making of the thrust reverser system.

Similarly, although no mention has been made to any synchronization between the movements of the two doors, such a synchronization, whatever its form is, may be added without the device obtained departing from the scope of the present disclosure.

Although the present disclosure has been described in connection with symmetrically disposed doors, it is possible to provide an actuation device having thrust reversal movable elements opening in an asymmetrical manner.

Although the present disclosure has been described in connection with a business jet type small airplane, it may be applied to large airplanes.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An actuation device for a thrust reverser comprising at least one thrust reversal movable element carried by a nacelle and displaceable between a retracted position and a deployed position, the actuation device comprising:

at least one actuator mounted on the nacelle, wherein each actuator of the at least one actuator includes a screw and a nut drivingly connected to the screw such that rotation of the screw translates the nut, wherein the screw is drivingly connected to a motor to be rotated by the motor and the nut is connected to the at least one thrust reversal movable element such that a stroke of the nut drives the at least one thrust reversal movable element toward the retracted position in response to rotation of the screw in a direction of retraction and toward the deployed position in response to rotation of the screw in a direction of deployment;

at least one lock that locks the at least one thrust reversal movable element in the retracted position; and at least one anti-deployment member configured to permit the screw to freely rotate in the direction of retraction, to permit the screw to freely rotate in the direction of deployment over a portion of the stroke of the screw corresponding to a passage from an over-retraction position of the at least one thrust reversal movable element to the retracted position, and to inhibit rotation of the screw in the direction of deployment beyond the portion of the stroke of the screw.

2. The actuation device according to claim claim 1, wherein the motor is directly connected to each actuator.

3. The actuation device according to claim 1, wherein the motor is connected to a plurality of actuators by mechanical transmission members.

4. The actuation device according to claim 1 further comprising at least two actuators having different actuation strokes or speeds.

5. The actuation device according to claim 1, wherein the at least one lock is electrically controlled.

6. The actuation device according to claim 1, wherein the at least one lock is hydraulically controlled.

7. The actuation device according to claim 1, wherein the motor is an electric motor.

8. The actuation device according to claim 1, wherein the motor is a hydraulic motor.

9. A method for actuating a thrust reverser using the actuation device according to claim 1, starting from the deployed position of the at least one thrust reversal movable element, the method comprising:

controlling the motor to drive the screw in the direction of retraction until the at least one thrust reversal movable element has reached the over-retraction position;

closing the at least one lock; and controlling the motor to drive the screw in the direction of deployment until a portion of the at least one lock carried by the at least one thrust reversal movable element is in contact with a portion of the at least one lock carried by the nacelle.

* * * * *